United States Patent
Cheevanantachai et al.

(10) Patent No.: US 7,012,793 B2
(45) Date of Patent: Mar. 14, 2006

(54) POWER CONVERTER WITH POLARITY REVERSAL AND INRUSH CURRENT PROTECTION CIRCUIT

(75) Inventors: Phichej Cheevanantachai, Samutprakarn (TH); Weng Leong Hon, Samutprakarn (TH)

(73) Assignees: Delta Electronics, Inc., (TW); Delta Electronics (Thailand) Public Company, Limited, (TH)

( * ) Notice: Subject to any disclaimer, the term of this patent is extended or adjusted under 35 U.S.C. 154(b) by 347 days.

(21) Appl. No.: 10/313,279

(22) Filed: Dec. 6, 2002

(65) Prior Publication Data

US 2004/0109272 A1    Jun. 10, 2004

(51) Int. Cl.
    *H02H 3/18* (2006.01)
(52) U.S. Cl. ......................................................... 361/82
(58) Field of Classification Search .................... 361/82
    See application file for complete search history.

(56) References Cited

U.S. PATENT DOCUMENTS

| | | | | |
|---|---|---|---|---|
| 3,935,511 A | * | 1/1976 | Boulanger et al. | 361/58 |
| 5,126,911 A | * | 6/1992 | Contiero et al. | 361/84 |
| 5,420,780 A | * | 5/1995 | Bernstein et al. | 363/89 |
| 5,574,632 A | * | 11/1996 | Pansier | 363/49 |
| 5,737,160 A | * | 4/1998 | Duffy | 361/3 |
| 5,737,161 A | * | 4/1998 | Thomas | 361/7 |
| 5,930,130 A | * | 7/1999 | Katyl et al. | 363/53 |
| 5,995,392 A | | 11/1999 | Turner | |
| 6,104,584 A | * | 8/2000 | Liu | 361/18 |
| 6,304,422 B1 | | 10/2001 | Sander et al. | |
| 6,400,101 B1 | * | 6/2002 | Biebl et al. | 315/291 |
| 6,493,245 B1 | * | 12/2002 | Phadke | 363/54 |
| 6,646,842 B1 | * | 11/2003 | Pan et al. | 361/58 |
| 6,714,397 B1 | * | 3/2004 | Mauder et al. | 361/93.9 |

* cited by examiner

*Primary Examiner*—Brian Sircus
*Assistant Examiner*—James A. Demakis
(74) *Attorney, Agent, or Firm*—Michael Best & Friedrich LLP

(57) ABSTRACT

A power converter for converting an input power into a desired output power adapted to a power-receiving device. The power converter includes a polarity reversal protection circuit preferably constructed with a schottky diode that is used to ensure the correct connection polarity of an input power, an inrush current protection circuit for limiting an inrush current from increasing, and a relay circuit coupled in parallel across the polarity reversal protection circuit and the polarity reversal protection circuit, the relay circuit being actuated to turn off in response to a polarity control signal for bypassing the inrush current so as to inhibiting the inrush current from flowing through the polarity reversal protection circuit.

14 Claims, 2 Drawing Sheets

POWER CONVERTER WITH POLARITY REVERSAL AND INRUSH CURRENT PROTECTION CIRCUIT

FIELD OF THE INVENTION

The present invention is related to a polarity reversal and inrush current protection circuit for a power converter, and more particularly to a power converter with a polarity reversal and inrush current protection circuit being implemented in a low impedance manner so as to reduce power loss incurred therein and enhance overall power conversion efficiency.

BACKGROUND OF THE INVENTION

Typically, a power converter is used for converting a power into a necessary or desirable power output tailored for a specific application. However, when the power supply that is designated to provide input power to the power converter is first switched on, a surge input current (known as inrush current) may be generated which is many times greater than the steady state current until the power supply reaches equilibrium. This abnormal inrush current will charge the smoothing capacitor at the output end of the power converter and in turn impair the diodes of a bridge rectifier.

To combat the inrush current problem, a resistor element may be utilized as an inrush current protection circuit. In the conventional art, a thermistor having a positive/negative temperature coefficient characteristic is employed as a current limiter for limiting inrush current from increasing. An example of such an inrush current protection circuit is given in U.S. Pat. No. 5,995,392, which is incorporated herein by reference. In this prior art reference, a current limiter including a fixed resistor and a positive temperature coefficient (PTC) thermistor that are connected in series across a control switch. The current limiter disclosed in this example is used to limit the inrush current supplied to the rectifier input terminal. In case of an excessive inrush current being applied to the power converter, the current flowing through the PTC thermistor causes it to heat up, and its resistance increases. The change in the resistance of the PTC thermistor is sufficiently high to decrease the current being drawn through the resistors to a safe value. Therefore, the remainder of the power converter is isolated from the input voltage, and thereby prevents the flickering of the power supply.

In addition to the inrush current protection circuit, it is necessary to add a polarity reversal protection circuit to ensure correct polarity connection of the power converter to the power supply. As can be known by one skilled in the art, if the power converter is connected to a power supply with reverse polarity, the power converter maybe inoperative, and may cause permanent damage or destruction to the electronic circuit. The polarity reversal protection circuit is then used as a failsafe device to avoid damages to the internal circuit of the power converter in case of polarity reversal. In most practical applications, the straightforward method for protecting a power converter from reversed supply voltage is to place a diode between the input terminal of power supply and the internal circuit of the power converter. The diode will allow a current to flow from the power supply to the internal circuit of the power converter when the diode is forward biased from a correct polarized supply voltage, and disallow a current to flow from the power supply to the internal circuit of the power converter when the power supply is connected in reverse direction. An embodiment of such prior polarity reversal protection circuit is explicated in U.S. Pat. No. 6,304,422, which is also incorporated herein by reference.

Although the prior art polarity reversal protection diode as described above can substantially protect the power converter from possible damages due to reverse polarity connection, it is a problem that the forward voltage drop appearing on polarity reversal protection diode when it is forward biased will cause a significant power loss during power conversion process. As a result of the power loss resulting from the voltage drop on the diode, the overall power conversion efficient of the power converter will be degraded, and the noise immunity of electronic circuit is deteriorated.

There is, therefore, an inclination to combine the polarity reversal protection circuit and inrush current protection circuit into a single power converter with fewer circuit components and reduced power loss.

SUMMARY OF THE INVENTION

Briefly summarized, the present invention discloses a power converter which is combined with a polarity reversal and inrush current protection circuit. The polarity reversal protection circuit according a preferable aspect of the present invention is constructed with a diode, which is preferably accomplished with a schottky diode for protecting the power converter from reversed supply voltage. The inrush current protection circuit according to a preferable aspect of the present invention is constructed with a thermistor coupled in series with the polarity reversal protection circuit and having a resistance being adjusted according to a temperature variation. The power converter according to a preferable aspect of the present invention further includes a current bypass circuit, which is preferably accomplished with a relay circuit for bypassing abnormal turn-on current of the power converter and inhibiting current from flowing through the polarity reversal protection circuit.

The foregoing and other features and advantages of the present invention will be best understood through the following descriptions with reference to the accompanying drawings, wherein:

DETAILED DESCRIPTION OF THE PREFERRED EMBODIMENT

The design fundamentals of the power converter according to the present invention include detouring the inrush current through a current bypass circuit implemented by an electromechanical element, i.e. a relay circuit. By bypassing the inrush current through the current bypass circuit and thus inhibiting inrush current from passing through the polarity reversal protection circuit when the power supply is switched on, the power converter can work in a lossless way and the noise immunity of electronic circuit is thus increased.

Figure 1:
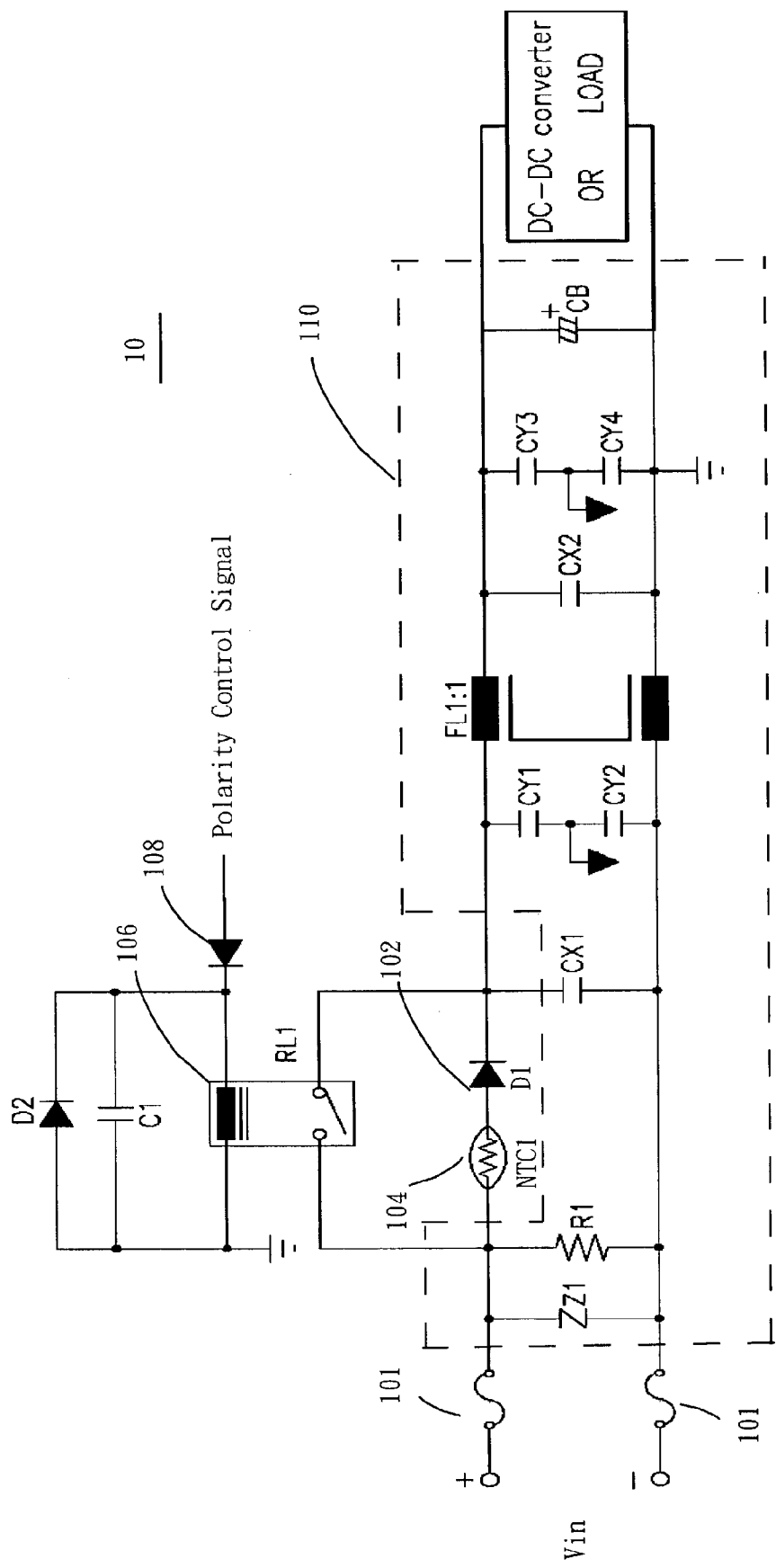
FIG. 1 is a circuit block diagram schematically showing a first circuit topology of a power converter according to a preferable embodiment of the present invention.
Figure 2:
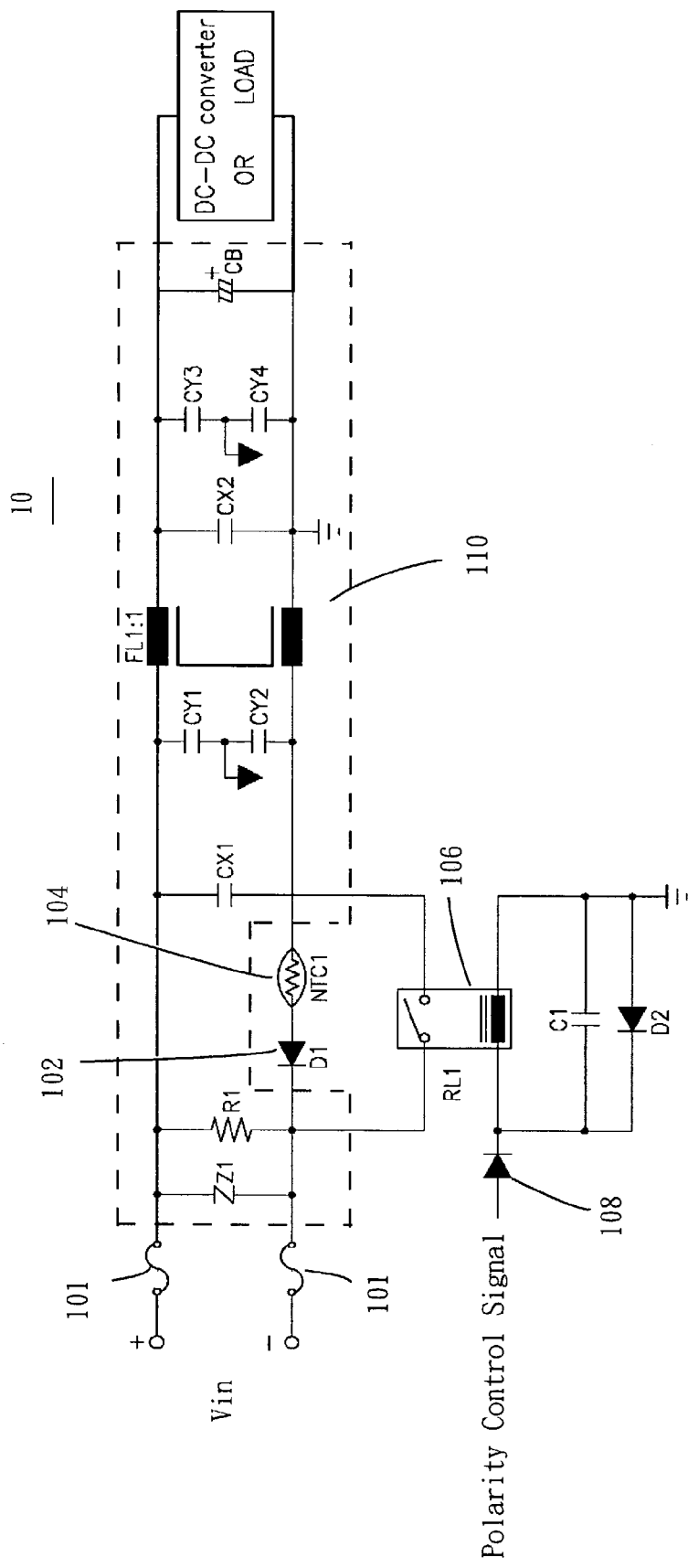
FIG. 2 is a circuit block diagram schematically showing a second circuit topology of a power converter according to a preferable embodiment of the present invention.

FIG. 1 diagrammatically shows a first circuit topology of a power converter 10 according to a preferable embodiment of the present invention, and FIG. 2 diagrammatically shows a second circuit topology of a power converter 10 according to a preferable embodiment of the present invention. It can be readily realized that the circuit configuration of FIG. 1 is arranged in such a way by placing the polarity reversal protection circuit and inrush current protection circuit in series with the positive input terminal of the power supply Vin, while the circuit configuration of FIG. 2 is arranged in such a way by placing the polarity reversal protection circuit and inrush current protection circuit in series with the negative input terminal of the power supply Vin. However, it is to be stressed that the principles of circuit operation of FIGS. 1 and 2 are similar with each other, and can make themselves to be effortlessly understood by an artisan without doubt.

The power converter 10 as shown in FIG. 1 and FIG. 2 embraces a power converting section 110 that is used to convert an input voltage into a desired output voltage adapted for a DC—DC converter or a load. The power converter of FIG. 1 and FIG. 2 further includes a polarity reversal protection circuit 102 which is used to ensure the correct connection polarity of the power supply Vin to the power converting section 110. In the present preferable embodiment, the polarity reversal protection circuit 102 is accomplished by a diode simply, which is more preferably directed to a schottky diode. The behavior of the diode 102 is conducted in a way that allows current to pass through the power converting section 110 when it is forward biased from correct connection polarity of the power supply Vin, and disallows current to pass through the power converting section 110 when the power supply Vin is connected to the power converting section 110 in reverse polarity. The fuses 101 are effective in preventing a spark from generation due to an abnormality of the relay circuit 106, which will be described in greater detail later.

Serially connected with the polarity reversal protection circuit 102 is an inrush current protection circuit 104. The inrush current protection circuit 104 according to a preferable embodiment of the present invention is constructed with a positive temperature coefficient (PTC) thermistor or a negative temperature coefficient (NTC) thermistor. The characteristic of the thermistor 104 enables its resistance to be adjusted according to temperature variation. In this manner, the thermistor 104 can increase/decrease its resistance in response to temperature variation and thereby regulate excessive inrush current flowing into the power converting section 110 to a safe level.

A current bypass circuit 106 is further coupled in parallel across the polarity reversal protection circuit 102 and the inrush current protection circuit 104. The current bypass circuit 106 is preferably accomplished by an electromechanical device, for example, a relay circuit. The relay circuit 106 is normally actuated by a polarity control signal being applied to the relay circuit 106 via a diode 108. In this preferable embodiment, the polarity control signal is used to enable the relay circuit 106 to turn on when the power supply Vin is turned on with correct polarity, thereby bypassing energy through the relay circuit 106. In this way, the turn-on current of the power converter 10 will not pass through the diode 102 directly, but is bypassed through the relay circuit 106 so tat the power loss due to forward-biased diode 102 is eliminated, whereby the overall power conversion efficiency of the power converter 10 is increased accordingly.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power converter comprising:
   a power converting section configured to convert an input voltage into a desired output voltage adapted for a power receiving device;
   a polarity reversal protection circuit in communication with an input terminal of the power converting section and configured to conduct only when a power supply is placed in correct polarity communication with the power converter;
   an inrush current protection circuit configured to limit an increase an inrush current, and including a thermistor in series communication with the polarity reversal protection circuit and including a resistance configured to adjust according to a temperature variation for regulating the inrush current to a safe level; and
   a current bypass circuit in parallel communication with the polarity reversal protection circuit and the thermistor, and configured to inhibit a flow of the inrush current through the polarity reversal protection circuit when the power supply is activated with a correct polarity.

2. The power converter according to claim 1 wherein the polarity reversal protection circuit comprises a diode.

3. The power converter according to claim 2 wherein the diode is a Shottky diode.

4. The power converter according to claim 1 wherein the current bypass circuit comprises a relay circuit.

5. The power converter according to claim 1 wherein the thermistor includes a positive temperature coefficient.

6. The power converter according to claim 1 wherein the thermistor includes a negative temperature coefficient.

7. The power converter according to claim 4 further comprising a fuse in communication with the input terminal of the power converter and the polarity reversal protection circuit, and configured to prevent the relay circuit from turning on due to an abnormality.

8. A power converter comprising:
 a power converting section configured to convert an input power into an output voltage adapted for a power receiving device;
 a polarity reversal protection circuit in communication with an input terminal of the power converting section, and configured to protect the power converting section from reverse connection polarity of the input power;
 an inrush current protection circuit configured to limit an inrush current from increasing, and including a thermistor in series communication with the polarity reversal protection circuit, and a resistance configured to adjust according to a temperature variation; and
 a relay circuit in parallel communication with the polarity reversal protection circuit and the thermistor, the relay circuit being actuated to turn off in response to a polarity control signal for bypassing the inrush current so as to inhibit the inrush current from flowing through the polarity reversal protection circuit when the input power is applied to an input terminal of tho power converter with a correct polarity.

9. The power converter according to claim 8 wherein the polarity reversal protection circuit comprises a diode.

10. The power converter according to claim 9 wherein the diode is a Shottky diode.

11. The power converter according to claim 8 wherein the thermistor includes a positive temperature coefficient.

12. The power converter according to claim 8 wherein the thermistor includes a negative temperature coefficient.

13. The power converter according to claim 8 wherein the polarity control signal is applied to the relay circuit through a diode.

14. The power converter according to claim 8 further comprising a fuse in communication with the input terminal of the power converter and the polarity reversal protection circuit, and configured to prevent the relay circuit from turning on due to an abnormality.

* * * * *